United States Patent [19]

Redgrave et al.

[11] Patent Number: 5,255,763
[45] Date of Patent: Oct. 26, 1993

[54] BRAKE CAM ROLLER FOLLOWER BRACKET

[75] Inventors: Christopher A. Redgrave, Portage; Jay D. White, Galesburg, both of Mich.

[73] Assignee: Eaton Corporation, Cleveland, Ohio

[21] Appl. No.: 910,064

[22] Filed: Jul. 8, 1992

[51] Int. Cl.⁵ .............................................. F16D 51/22
[52] U.S. Cl. ............................ 188/330; 188/250 C; 188/250 F; 188/332; 192/78; 411/351; 411/513; 411/530
[58] Field of Search ............... 188/324, 329, 330, 332, 188/338, 339, 341, 250 C, 250 F; 192/78, 93 R; 411/351, 513, 530, 340, 515, 522; 24/573.1, 271, 283, 205; 403/152, 155

[56] References Cited

U.S. PATENT DOCUMENTS

| | | | |
|---|---|---|---|
| 2,710,076 | 6/1955 | Russell | 188/330 |
| 2,781,868 | 2/1957 | House | 188/330 |
| 3,275,103 | 9/1966 | Lyon | 188/78 |
| 3,469,660 | 9/1969 | Mathers | 188/330 |
| 4,503,953 | 3/1985 | Majewski | 188/330 |
| 4,624,348 | 11/1986 | Williams | 188/330 |
| 4,679,677 | 7/1987 | Zawodni | 188/341 |
| 4,807,729 | 2/1989 | Sampson | 188/330 |
| 5,044,475 | 9/1991 | Clark | 188/329 |

FOREIGN PATENT DOCUMENTS

| | | | |
|---|---|---|---|
| 0563764 | 12/1923 | France | 188/206 A |
| 1252760 | 11/1971 | United Kingdom | 411/513 |

*Primary Examiner*—Robert J. Oberleitner
*Assistant Examiner*—Josie A. Ballato
*Attorney, Agent, or Firm*—A. E. Chrow

[57] ABSTRACT

A roller follower (12) and bracket (20) combination for use in a rotary cam type brake shoe assembly (100) is provided in which bracket (20) is supported on a web (2) of a brake shoe in such a manner that, when a free-end (27) of bracket (20) is inserted into an opening (26) in a trunnion (24) of a pin (11) that supports roller follower (12) for rotation, bracket (20) is operative to prevent roller follower support pin (11) from being rotated by the cam to lessen noise heretofore created by the rotation of trunnion (24) against web (2).

5 Claims, 2 Drawing Sheets

BRAKE CAM ROLLER FOLLOWER BRACKET

INTRODUCTION

This invention relates generally to a bracket for use in connection with a vehicle rotary cam roller follower of a vehicular brake shoe assembly and more particularly to a combination of such roller follower support pin having at least one opening in at least one trunnion of a support pin that supports the roller follower for rotation thereabout and into which a free-end of the bracket is received to prevent the roller follower pin from being rotated by the rotary cam as a means of eliminating noise associated with rotation of the roller follower during braking activity.

BACKGROUND OF THE INVENTION

This invention is particularly useful in connection with a brake assembly of the type disclosed in U.S. Pat. No. 2,710,076 that is assigned to the assignee of the present invention and, the disclosure of which is incorporated herein by reference and in which the brake assembly includes a pair of adjacent brake shoe webs or ribs of an arcuate support plate to which a friction braking material is secured. Adjacent ends of the web are pivotally mounted to a fixed support and a rotary actuating cam (commonly an "S" shaped cam) is disposed between the opposite ends of the brake shoes. An opensided recess is included in the end of each brake shoe web facing towards the rotary brake cam in which the trunnions of the pin that rotationally supports the roller follower are respectively nestled and a spring member is connected between opposite webs of the brake shoe pair in a manner holding the roller followers against the opposite cam surfaces of the rotary cam.

Application of the brakes by an operator causes the cam to rotate against the opposed roller followers and urge them apart to the extent enabling the friction braking material to engage the wheel brake drum and slow or stop the vehicle.

Rotation of the brake cam against the opposed roller followers causes the respective roller follower support pins to rotate in the web recess in which their trunnions are respectively nestled and produce noise created by metal rubbing against metal since roller bearings are characteristically not employed.

To some, such noise may be objectionable and, in an effort to eliminate such noise while retaining the above described roller follower and web design, a bracket has now been developed that is able to prevent the roller follower support pin from rotating and it is to the combination of the bracket and the roller follower support pin to which the present invention is addressed.

Although a variety of brackets have heretofor been developed to retain the roller follower support pin trunnions in the web recesses to prevent dislodgement therefrom such as disclosed in U.S. Pat. Nos. 3,275,103; 4,503,953; 4,624,348; 4,679,677 and 4,807,729, the disclosures of which are incorporated herein by reference and the last of which is assigned to the assignee of the present invention. All have been designed so as not to inhibit rotation of the roller follower support pin.

SUMMARY OF THE INVENTION

Accordingly, it is an object of this invention to provide a vehicle rotary cam type brake assembly employing a roller follower rotationally supported by a pin that is prevented from rotating to lessen noise associated with braking activity.

It is another object of this invention to provide a vehicle brake assembly of the type employing a rotary cam against which a pair of opposed roller followers are resiliently held and that are rotationally supported by respective pins that are prevented from being rotated by the cam so as to eliminate noise that heretofor may have been objectionable to some.

DESCRIPTION OF SOME PREFERRED EMBODIMENTS

Figure 1:
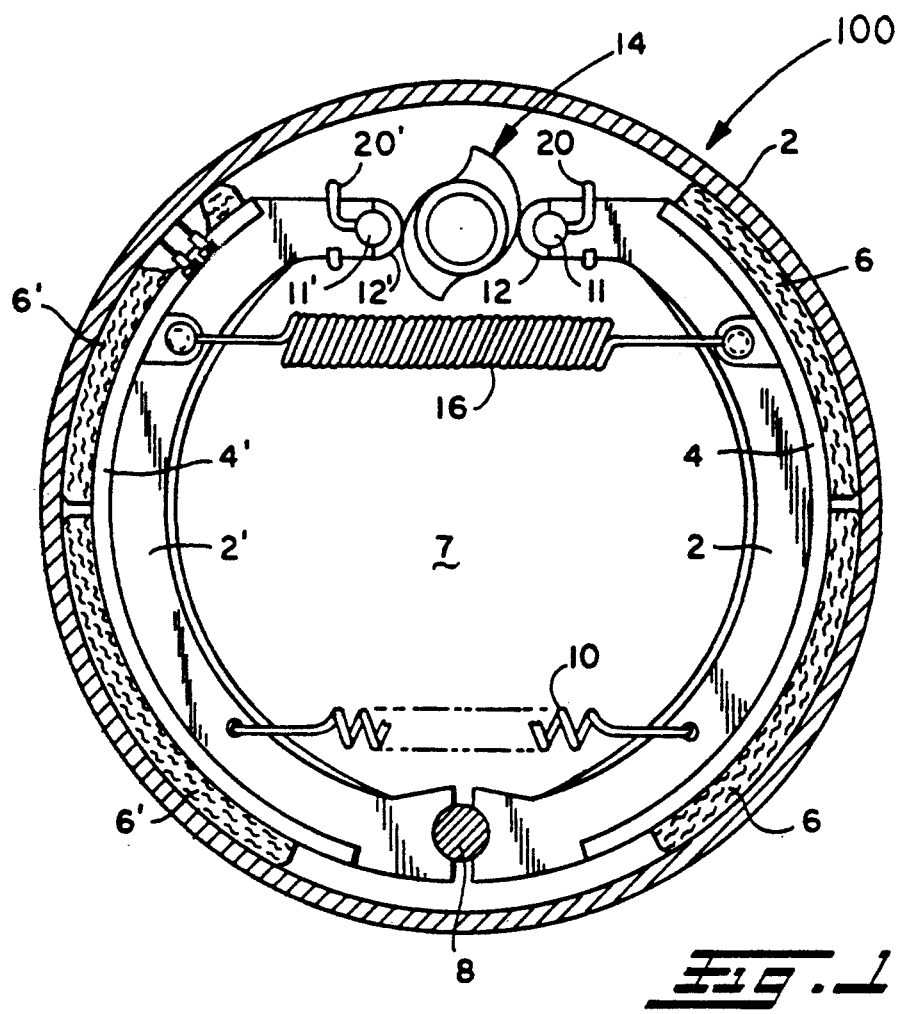
FIG. 1 is a side elevation view of a brake assembly 100 employing an embodiment of the bracket and roller follower combination of the invention.

The brake shoe assembly 100 of FIG. 1 is operative to frictionally brake a rotary brake drum 2 that is part of a conventional vehicular wheel assembly.

Brake shoe assembly 100 has a pair of opposed brake shoes having paired ribs or webs 2 and 2' to which respective arcuate support plates 4 and 4' are either secured or integral with. A pair of pads 6 of a suitable frictional brake material are secured to the side of support plate 4 facing towards brake drum 2 and a corresponding pair of pads 6' are secured to the side of support plate 4' facing towards brake drum 2.

Adjacent ends of ribs 2 and 2' are pivotally mounted to a stationary back plate 7 of the wheel assembly. Although various other methods may be employed to pivotably mount adjacent ends of the brake shoes to stationary back plate 2, the method shown in FIG. 1 is especially preferred in which arcuate ends of ribs 2 and 2' are respectively held against pivot posts 8 by a tension spring 10.

The adjacent opposite ends of paired ribs 2 and 2' carry roller follower pins 11 and 11' that are respectively prevented from rotating by brackets 20 and 20' hereinafter more fully described with respect to FIGS. 2 and 3.

A rotary "S" cam 14 is disposed between roller rollowers 12 and 12' and a tension spring 16 is secured to paired ribs 2 and 2' with sufficient tension to hold opposed roller followers 12 and 12' against opposite side cam surfaces of cam 14.

Cam 14 rotates in opposite directions whenever the vehicle operator applies or releases the brakes. In FIG. 1, the operator has applied the brake causing cam 14 to rotate clockwise and pivot the opposed brake shoes away from each other for a distance sufficient to enable pads 6 and 6' of the frictional brake material to engage and frictionally slow or stop drum 2 from rotating depending upon the extent to which the brakes are applied.

Figure 2:
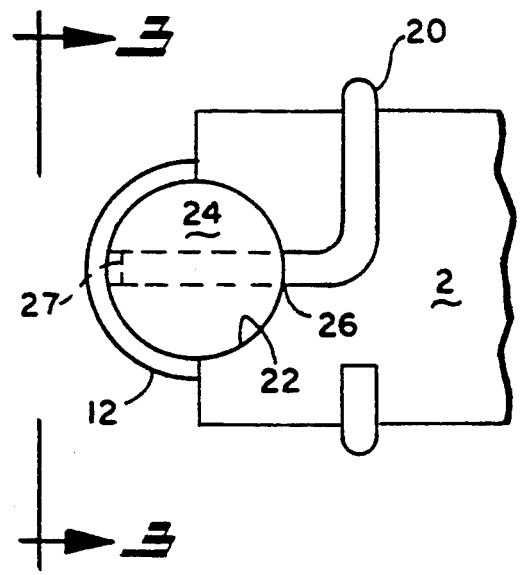
FIG. 2 is an enlarged side elevation view of the bracket and roller follower combination of FIG. 1.
Figure 3:
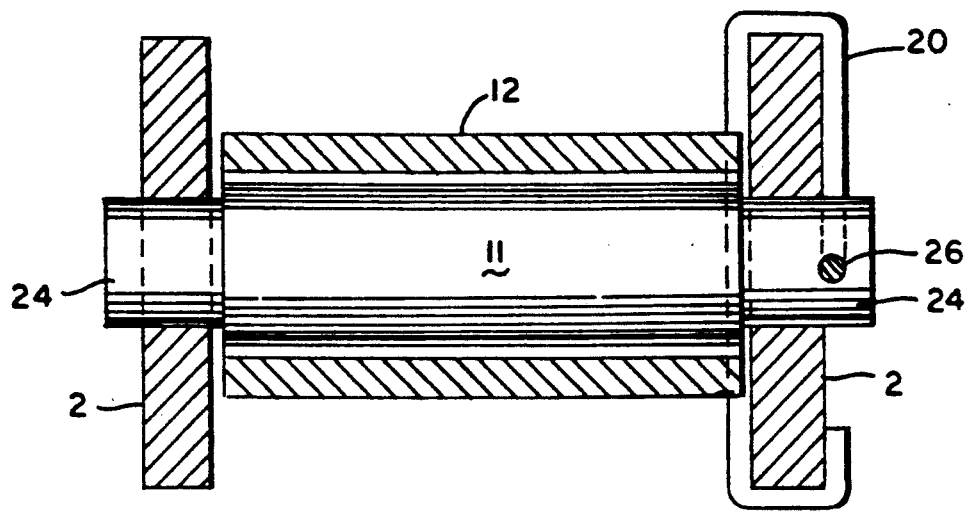
FIG. 3 is an end view of the roller follower and bracket combination of FIGS. 1 and 2 taken along view line 3—3.

Instead of being rotated by rotary cam 14, roller follower pins 11 and 11' are respectively prevented from rotating by brackets 20 and 20' of which bracket 20 shown in FIGS. 2 and 3 is not required to but preferably has the mirror image configuration of bracket 20'.

Roller followers 12 and 12' have respective openings therethrough that enable them to rotate about the respective pins that support them for rotation such as pin 11 shown in FIG. 3.

In FIGS. 2 and 3, webs 2 (which are spaced apart in substantial parallel relationship to each other at least at the end adjacent cam 14 as shown in FIG. 3) has corresponding arcuate recesses 22 in their respective ends adjacent cam 14 in which opposite trunnions 24 of roller follower support pin 11 are respectively nestled.

In the absence of bracket 20, trunnions 24 are free to rotate in arcuate recesses 22 and, since roller bearings are not employed, may produce undesirable noise. Although trunnions 24 are held in recesses 22 by roller follower 12 being held against cam 14 by spring 16, various types of retainers (not described here) have been devised to hold the trunnions in the recesses without inhibiting rotation of the trunnions.

Although a singular bracket of the invention may be used on one web of each of the opposed brake shoes, brackets of the invention may be employed on each web of each brake shoe if such is desired.

At least one opening 26 is disposed in at least one roller support pin trunnion 24 on the side of one web facing away from the other web as shown in FIG. 3. Opening 26 extends into trunnion 24 for a distance sufficient to enable bracket 20 to prevent roller follower pin 11 from rotating. In FIGS. 2, and 3 opening 26 extends all the way through trunnion 24.

Bracket 20 is supported on web 2 in a manner such that when a free-end 27 thereof is received into opening 26 for a prescribed distance, bracket 20 is operative to prevent roller follower support pin 11 from rotating.

Figure 4:
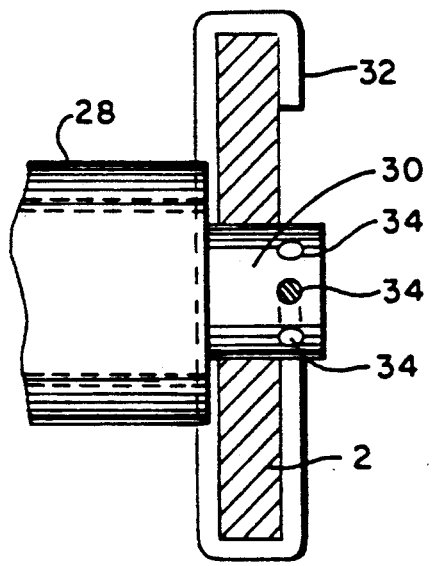
FIG. 4 is a partial end view of another embodiment of the roller follower and bracket combination of the invention.

Although bracket 20 may be supported or secured to web 2 in any manner operative to enable a free-end to extend therefrom into the opening in the trunnion to prevent the roller follower pin from rotating, it is preferably wrapped about the web in the manner shown in FIGS. 3 and 4 such that it bridges across opposite edges of the web at least once.

As can be seen in FIGS. 3 and 4, bracket 20, preferably has a "C" shaped configuration having the open side thereof on the side of one web facing away from the other web.

Although the bracket of the invention may be made from suitable metal or plastic materials having a cross sectional configuration suitable for supporting it on the brake shoe web and operating in the manner required, it is preferably in the form of a wire made from suitable metal having a circular cross-section having a diameter sufficient to provide mechanical properties including stiffness effective to prevent the roller follower support pin from rotating.

In FIG. 4, it will be noted that the free-end of bracket 32 enters opening 34 in trunnion 30 of the support pin for roller follower 28 from below rather than from above as shown for bracket 20 in FIGS. 2 and 3.

It will be noted that trunnion 30 has a plurality of openings 34 therein that are disposed in circumferential spaced-apart relationship to each other. Such is of advantage to account for wear that may incur by the rollower follower support pin. The plurality of openings enables one to remove the bracket free-end from one opening and then rotate the roller follower sufficiently to insert the free-end into another opening in the trunnion, to present an un-worn surface of the roller follower support pin facing towards the rotary cam.

What is claimed is:

1. In combination:
   a rotary vehicular brake cam roller follower support pin having trunnions respectively extending away from opposite sides thereof and mounted for rotation at the end of spaced-apart webs of a brake shoe,
   at least one opening in at least one of the trunnions adjacent a side of a web that faces away from the other web, and
   a bracket member having a free-end extending into the opening and wrapped about said web in a manner operative to enable the bracket to prevent the roller follower support pin from rotating.

2. The combination of claim 1 wherein the roller follower support pin trunnion has a plurality of the openings therein that are disposed in circumferential spaced-apart relationship to each other about the outer surface of the trunnion and operative to enable periodic rotation of the trunnion for selective receipt of the bracket free-end therein.

3. The combination of claim 1 wherein the opening extends through the trunnion.

4. The combination of claim 1 wherein the bracket has a "C" shaped configuration and is supported on the web with the open side thereof on the side of the web facing away from the other web.

5. The combination of claim 1 wherein the bracket is a wire bracket.

* * * * *